United States Patent [19]

Hattori

[11] Patent Number: 5,970,450
[45] Date of Patent: Oct. 19, 1999

[54] SPEECH RECOGNITION SYSTEM USING MODIFIABLE RECOGNITION THRESHOLD TO REDUCE THE SIZE OF THE PRUNING TREE

[75] Inventor: Hiroaki Hattori, Tokyo, Japan

[73] Assignee: NEC Corporation, Tokyo, Japan

[21] Appl. No.: 08/977,346

[22] Filed: Nov. 24, 1997

[30] Foreign Application Priority Data

Nov. 25, 1996 [JP] Japan .................................. 8-313274

[51] Int. Cl.⁶ ...................................................... G10L 5/06
[52] U.S. Cl. ........................................... 704/239; 704/238
[58] Field of Search .................................... 704/231, 234, 704/243, 244, 236, 238, 239, 254

[56] References Cited

U.S. PATENT DOCUMENTS

| | | | |
|---|---|---|---|
| 4,624,008 | 11/1986 | Vensko et al. | 704/253 |
| 4,783,803 | 11/1988 | Baker et al. | 704/252 |
| 4,811,399 | 3/1989 | Landell et al. | 704/253 |
| 4,977,598 | 12/1990 | Doddington et al. | 704/255 |
| 4,980,918 | 12/1990 | Bahl et al. | 704/240 |
| 5,140,668 | 8/1992 | Hattori | 704/264 |
| 5,241,619 | 8/1993 | Schwartz et al. | 704/200 |
| 5,349,645 | 9/1994 | Zhao | 704/243 |
| 5,577,162 | 11/1996 | Yamazaki | 704/232 |
| 5,651,094 | 7/1997 | Takagi et al. | 704/244 |
| 5,712,956 | 1/1998 | Yamada et al. | 704/234 |
| 5,749,069 | 5/1998 | Komori et al. | 704/240 |
| 5,774,848 | 6/1998 | Hattori | 704/244 |
| 5,806,021 | 9/1998 | Chen et al. | 704/9 |

FOREIGN PATENT DOCUMENTS

| | | |
|---|---|---|
| 0 525640 | 2/1993 | European Pat. Off. . |
| 96/27872 | 9/1986 | WIPO . |

OTHER PUBLICATIONS

Hiroaki Sakoe, et al, "A High Speed DP–Matching Algorithm Based on Frame Syncronization, Beam Search and Vector Quantization", pp. 1650–1659, 1988.

Jinichi Murakami, et al, "A Spontaneous Speech Recognition Algorithm with Pause and Filled Pause Procedure", pp. 71–78, 1994.

L.R. Rabiner, et al., "An Introduction to Hidden Markov Models", pp. 4–16, 1986.

Anonymous: Dynamic Thresholding Scheme For Fast Match IBM Technical Disclosure Bulletin, vol. 32, No. 9B, Feb. 1990, pp 236–237.

Khoda M: A Study of Modifying Pruning Strategies for DP Beam Search at a preset input frame Systems & Computers in Japan, vol. 24 No. 3, 1993, pp. 98–110, XP000504548.

Hiroaki Sakoe et al., "A High–Speed DP–Matching Algorithm based on fram synchronization, beam search and vector quantization", Systems and Computers in Japan, vol. 20, Nov. 1998, pp. 33–44, XP000128842.

S. Ortmanns et al, "Language–Model Look–Ahead for Large Vocabulary Speech Recognition", Proceedings of the ICSLP, pp. 1–4, 1996.

Volker Steinbiss et al, "Improvements in Beam Search", Proceedings of the ICSLP, pp. 2143–2146, 1994.

*Primary Examiner*—David R. Hudspeth
*Assistant Examiner*—Michael N. Opsasnick
*Attorney, Agent, or Firm*—Foley & Lardner

[57] ABSTRACT

A speech recognition system, in which partial reference patterns, and cumulative similarities of these patterns, are stored in a temporary pattern memory. The partial reference patterns are to be used as subjects of a similarity computation with an input speech pattern that has its feature quantities extracted by a speech analyzing unit. A counting unit counts partial reference patterns having corresponding cumulative similarities that are higher than a threshold value stored in a threshold memory. A threshold computing unit computes a threshold of pruning from a correspondence relation between the number of partial reference patterns that have corresponding cumulative similarities that exceed the threshold, and the threshold. A similarity computing unit computes a similarity, with respect to the feature quantities, of partial reference patterns with corresponding cumulative similarities that are greater than the threshold of pruning. A determining unit determines, as a result of recognition, a word which corresponds to one of the partial reference patterns with a highest similarity.

6 Claims, 9 Drawing Sheets

SPEECH RECOGNITION SYSTEM USING MODIFIABLE RECOGNITION THRESHOLD TO REDUCE THE SIZE OF THE PRUNING TREE

BACKGROUND OF THE INVENTION

The present invention relates to a speech recognizing system for recognizing speech through similarity computation involving pruning on the basis of a threshold and, more particularly, to a speech recognizing system capable of reducing the number of reference patterns of words to be recognized.

As means for reducing the processing effort in this type of speech recognition, a beam search process is well known in the art. The beam search process aims at processing effort reduction by pruning out reference patterns which are low in similarity to input speech and dispensing with a recognizing process on these low similarity reference patterns. The beam search process is detailed in Sakoe et al, "High rate DP Matching by Combined Frame Synchronization, Beam Search and Vector Quantization", Trans. of IECE of Japan, Vol. J71-D, No. 9, pp. 1650–1659, 1988-10 (hereinafter referred to as Literature 1). As a pruning process, Literature 1 shows one, in which similarity comparison is made with reference to a predetermined threshold to leave reference patterns with similarities higher than the threshold.

Murakami et al, "Expansion of Words to Speech Recognition and Free Speaking Recognition Utilizing Trigram", Technical Report of IECE of Japan, SP 93-127, 1994-01 (hereinafter referred to as Literature 2), shows a pruning process, in which a predetermined number of reference patterns with higher similarities are left. Literature 2 also shows another pruning process, in which search is performed for a threshold which gives a predetermined number of reference patterns that remain.

Figure 6:
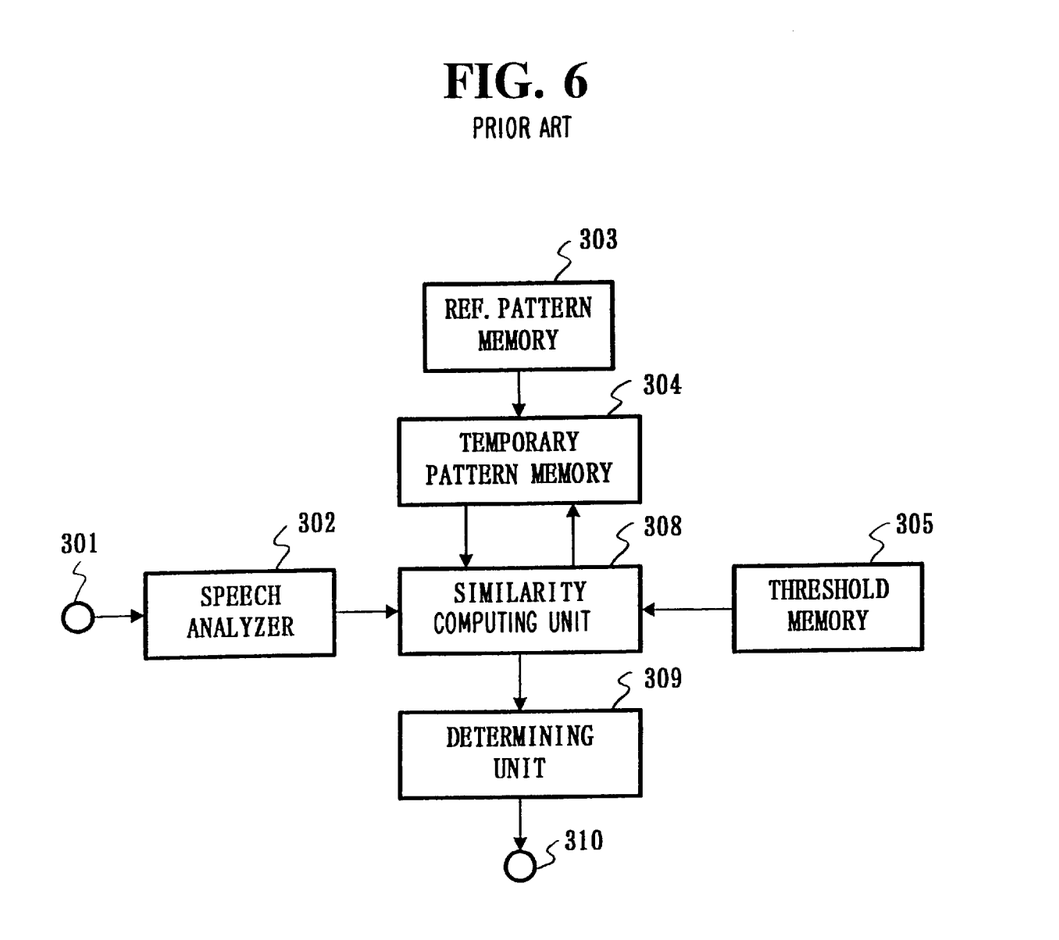
FIG. 6 is a block diagram showing the basic construction of a prior art speech recognition system.

FIG. 6 is a block diagram showing the basic construction of a prior art speech recognition system (shown in Literature 1).

In this speech recognition system, a speech waveform is inputted as input speech data from an input terminal 301 to a speech analyzer 302 for its conversion to a feature vector series representing its acoustical features. Reference patterns representing acoustical features of words to be recognized, are cumulatively stored in a reference pattern memory 303. Partial reference patterns (or branches) which are subjects of similarity computation and the prevailing accumulation, are stored in a temporary pattern memory 304. A predetermined threshold is stored in a threshold memory 305.

A similarity computing unit 308 computes acoustical feature similarities, with input feature parameters, of those of branches, i.e., partial reference patterns, among those stored in the temporary pattern memory 304 having similarities higher than a threshold stored in the threshold memory 305. A determining unit 309 determines one of the branches stored in the temporary pattern memory 304 having the highest cumulative similarity as a result of recognition and, when similarity computations with all input feature parameters have been completed, or when it has become that the branches stored in the temporary pattern memory 304 all belong to a single word, and outputs this recognition result to an output terminal 310.

Figure 7:
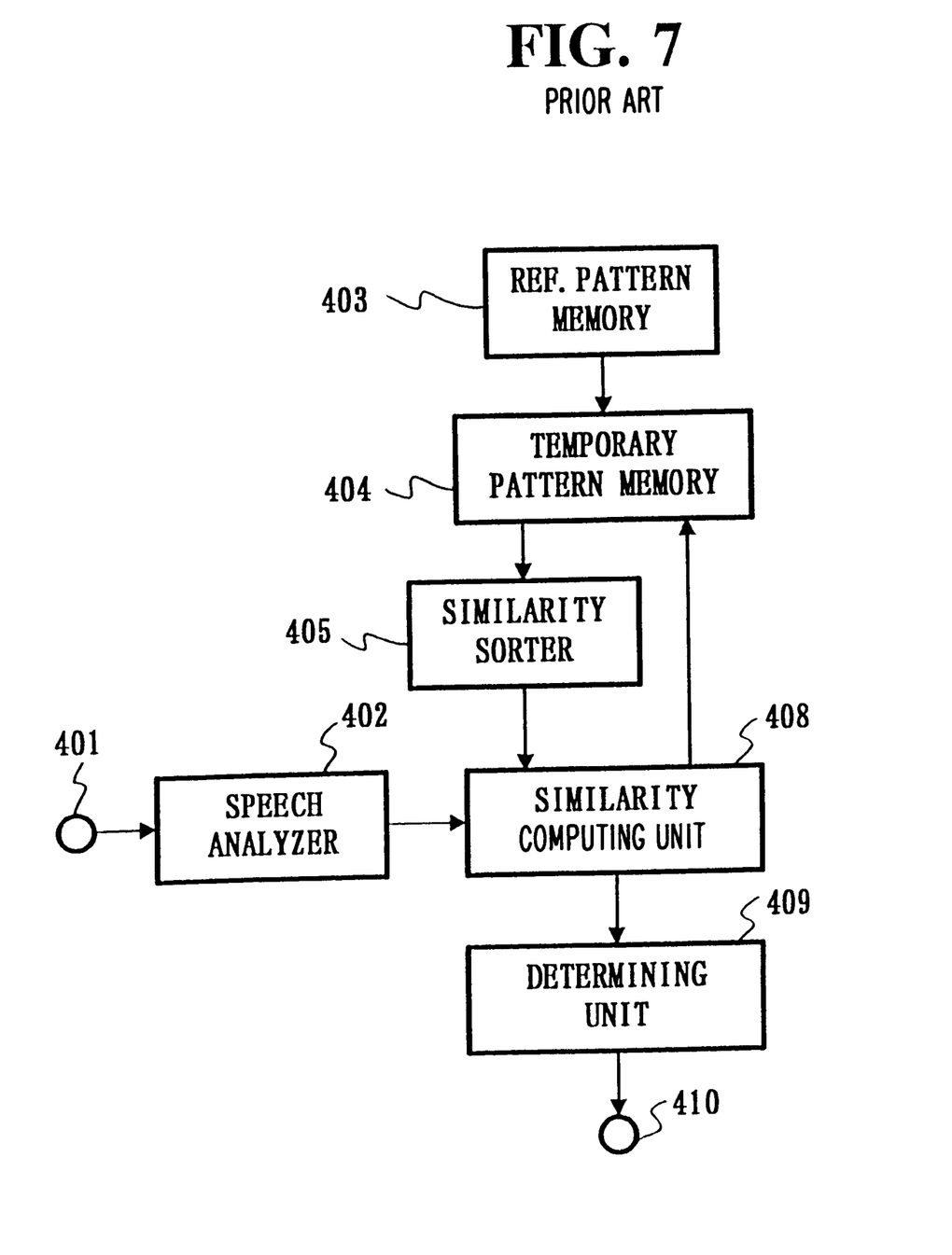
FIG. 7 is a block diagram showing a basic construction of another prior art speech recognition system.

FIG. 7 is a block diagram showing a basic construction of another prior art speech recognition system (shown in Literature 2).

In this speech recognition system, a speech waveform is inputted as input speech data from an input terminal 401 to a speech analyzer 402 for its conversion to a feature vector series representing its acoustical features. Reference patterns representing acoustical features of words to be recognized are cumulatively stored in a reference pattern memory 403. Partial reference patterns (or branches) as subjects of similarity computation and the prevailing accumulation likelihood, are stored in a temporary pattern memory 404.

A similarity sorter 405 sorts out the branches, i.e., the partial reference patterns, stored in the temporary pattern memory 404 in the order of higher cumulative similarities. A similarity computing unit 408 computes acoustical feature similarities, with input feature parameters, of a predetermined number of higher similarity branches from the one of the highest similarity, having been sorted out in the similarity sorter 405 and stored in the temporary pattern memory 404, and updates the branches stored in the temporary pattern memory 404 and the accumulation likelihood. A determining unit 409 determines one of the branches stored in the temporary pattern memory 404 having the highest cumulative similarity as a result of recognition, when similarity computations with all input feature parameters have been completed, or when it has become that the branches stored in a temporary pattern memory 404 belong to a single word, and outputs the recognition result to an output terminal 410.

Figure 8:
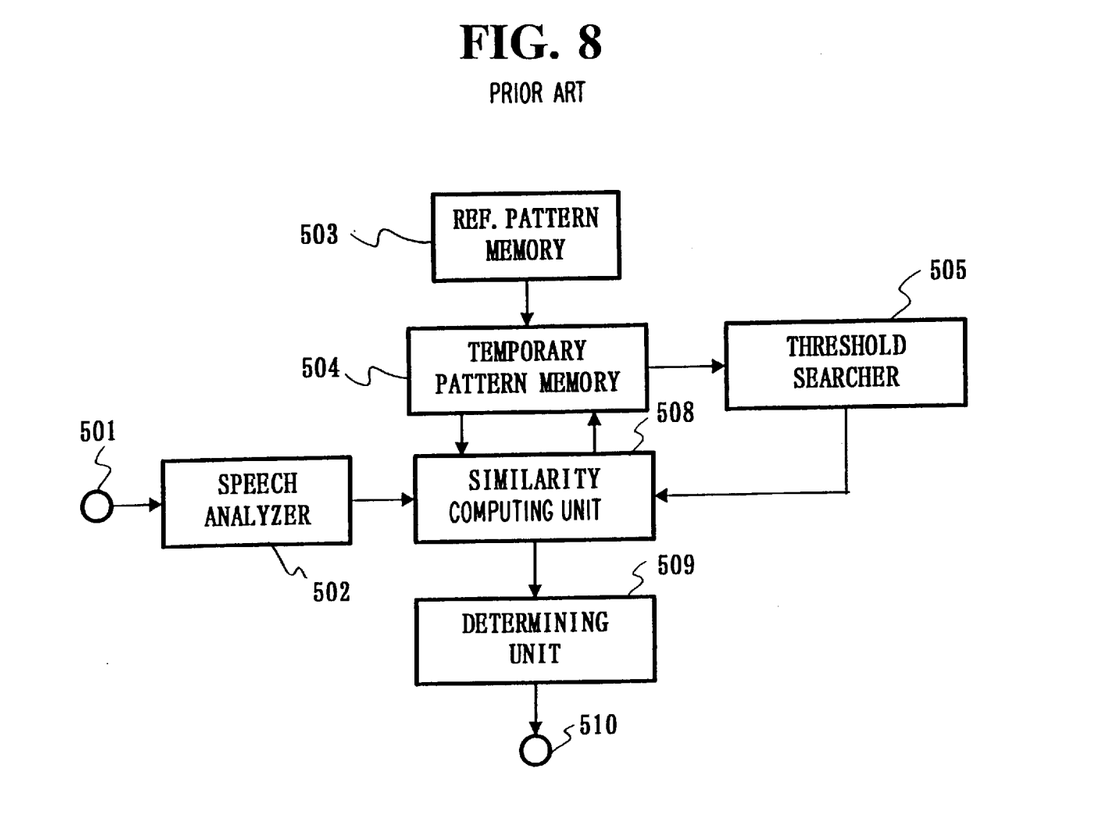
FIG. 8 is a block diagram showing a basic construction of a further prior art speech recognizer.

FIG. 8 is a block diagram showing a basic construction of a further prior art speech recognizer (shown in Literature 2).

In this speech recognizer, a speech waveform is inputted as input speech data from an input terminal 501 to a speech analyzer 502 for its conversion to a feature vector sequence representing its acoustical features. Reference patterns representing acoustical features of words to be recognized are stored in a reference pattern memory 503. Partial reference patterns (or branches) as subjects of similarity computation and the prevailing accumulation likelihood are stored in a temporary pattern memory 504.

A threshold searcher 505 searches a threshold, which leaves a predetermined number of branches, i.e., partial reference patterns, among those stored in the temporary pattern memory 504. A similarity computing unit 508 computes acoustical feature similarities, with input feature parameters, of only branches of similarities higher than the threshold obtained in the threshold searcher 505 among those stored in the temporary pattern memory 504, thereby updating the temporary pattern memory 504. A determining unit 509 determines one of the branches stored in the temporary pattern memory 504 having the highest cumulative similarity as a result of recognition, when similarity computations with all input feature parameters have been completed, or when it has become that the branches stored in the temporary pattern memory 54 all belong to a single word, and outputs the recognition result to an output terminal 510.

In the speech recognition system shown in FIG. 6, a predetermined threshold is given. In this case, it is impossible to control the number of branches that are left in the beam after pruning. This gives rise to a problem that the number of branches after pruning may be excessive to make read-time operation difficult or insufficient to result in pruning of correct vocabulary branches.

In the speech recognition system shown in FIG. 7, denoting the number of branches to be sorted by N, computational effort of the order of N log N is necessary. Therefore, as N is increased, the processing effort necessary for the sorting is increased to result in an excessive process time.

In the speech recognition system shown in FIG. 8, the threshold can be searched efficiently by two-branched search. In this case, the processing effort, i.e., computational effort, necessary for obtaining the threshold is reduced compared to the case of sorting all the branches as shown in FIG. 7. Nevertheless, computational effort of the order of log N is necessary. Therefore, as N is increased, the processing effort necessary for the sorting is increased to result in an excessive process time.

In the above speech recognition systems, the threshold cannot be changed such as to give a desired number of branches. Therefore, it is impossible to obtain accurate and quick speech recognition with less computational effort.

SUMMARY OF THE INVENTION

The present invention seeks to solve the above problems, and its object is to provide speech recognition system, which permits accurate and quick recognition to be obtained with less computational effect.

According to an aspect of the speech recognition system comprising: a speech analyzing unit for analyzing an input speech waveform to extract feature quantities and converting the extracted feature quantities to an input pattern; a reference pattern memory for storing reference patterns of words to be recognized; a temporary pattern memory for storing partial reference patterns as subjects of similarity computation with the input pattern among the stored reference patterns and the cumulative similarities of the partial reference patterns and the input pattern with one another; a threshold memory for storing at least one prevailing threshold; a counting unit for counting partial reference patterns of higher cumulative similarities among the stored partial reference patterns by comparing the cumulative similarities with the prevailing thresholds; a threshold computer for computing a threshold of pruning which gives a predetermined number of branches according to the correspondence relation between the number of branches and the threshold of pruning; a similarity computer for computing similarities of higher cumulative similarities among the stored partial reference patterns with the extracted feature quantities with respect to the threshold of pruning; and a determining unit for determining a word corresponding to one of the partial reference patterns with the highest similarity as a result of recognition.

According to another aspect of the present invention, there is provided a speech recognizing method comprising steps of memorizing partial reference patterns to be subjects of similarity computation with an input pattern and cumulative similarities of these patterns, comparing the memorized cumulative similarities with a prevailing threshold and counting partial reference patterns of higher cumulative similarities than the prevailing threshold, computing a threshold of pruning from the correspondence relation between the number of branches and the prevailing threshold, computing similarity, with the featuring quantities, of partial reference patterns with higher similarities with reference to the prevailing threshold of pruning, and determining a word corresponding to one of the partial reference patterns with the highest similarity as a result of recognition.

In the speech recognition system according to the present invention, the threshold memory has one or more prevailing thresholds, the threshold computing unit estimates the relation between the number of branches and the prevailing threshold on the basis of from the number of branches corresponding to the prevailing threshold, and a threshold of pruning which gives a desired number of branches is obtained from the relation and used for the pruning. Further, the threshold updating unit updates the prevailing threshold of pruning by using as values in the neighborhood of the prevailing threshold as new prevailing thresholds. It is thus possible to make setting and updating of the prevailing threshold with less computational effort.

Other objects and features will be clarified from the following description with reference to attached drawings.

PREFERRED EMBODIMENTS OF THE INVENTION

Embodiments of the present invention will now be described with reference to the drawings.

Figure 1:
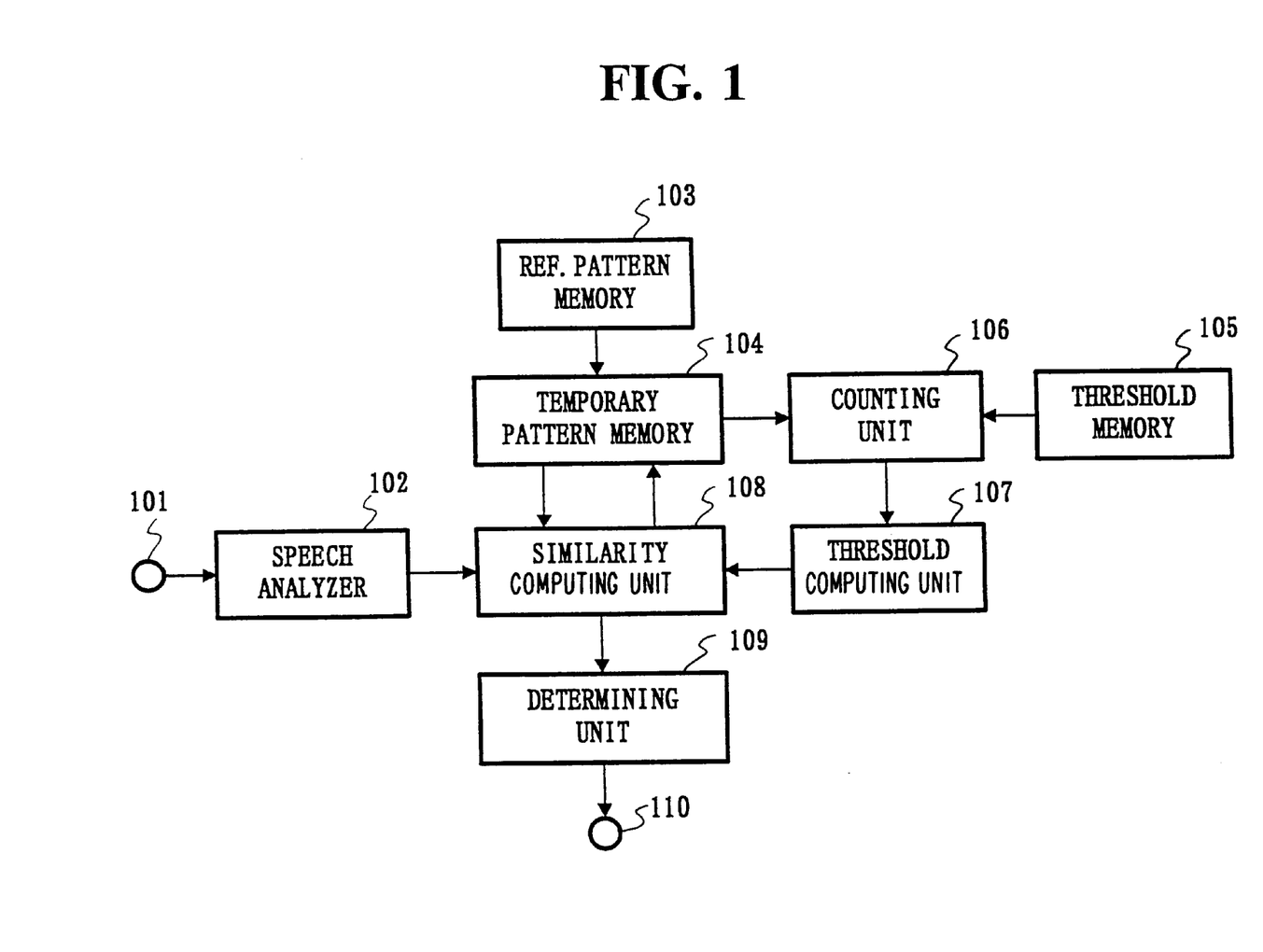
FIG. 1 is a block diagram showing a basic construction of an embodiment of the speech recognition system according to the present invention.

FIG. 1 is a block diagram showing a basic construction of an embodiment of the speech recognition system according to the present invention.

This speech recognition system comprises a speech analyzer 102 for analyzing an input speech waveform to extract feature quantities thereof and executing a conversion thereof to an input pattern, a reference pattern memory 103 for storing reference patterns of words to be recognized, a temporary pattern memory 104 for storing partial reference patterns or branches as subjects of similarity computation with input patterns among the reference patterns and also cumulative similarities of the branches with the input patterns, a threshold memory 105 for storing at least one prevailing threshold, a counting unit 106 for counting branches of higher similarities than the prevailing threshold, a threshold computing unit 107 for computing a threshold of pruning corresponding to a predetermined number of branches in accordance with the relation between the prevailing threshold and number of branches, and a similarity computing unit 108 for computing similarity, with feature quantities, of branches of higher similarities with respect to the threshold of pruning, and a determining unit 109 for determining a word corresponding to one of the branches in the temporary pattern memory 104 with the highest similarity.

In this speech recognition system, a speech waveform is inputted as input speech data from an input terminal 101 to the pattern analyzer 102 for its acoustical analysis for every 15 ms. for instance, to obtain a feature vector series containing speech power representing its acoustical features. The feature vector may be Cepstrum, LPC coefficient, changes in these values with time, etc., which are obtainable by FFT analysis, Linear Prediction Analysis, etc. mentioned in Furui "Digital Speech Processing", Publishing Association, Tokai University (hereinafter referred to as Literature 3).

Reference patterns representing acoustical features of words to be recognized are cumulatively stored in a reference pattern memory 103. As the reference patterns, time sequential patterns are stored in the case of DP matching, while states are stored in the case of HMM, although this depends on the recognition system. It is not only possible to make words to be units of recognition to store patterns of the words, but also possible to make sound elements or syllables of words as units of recognition to store these sound elements or syllables together with coupling data thereof (language models).

Partial reference patterns as subjects of similarity computation and the prevailing accumulation likelihood are stored in the temporary pattern memory 104. This temporary pattern memory 104 is a work area GNJ shown in Literature 1. According to Literature 1, words N and frame numbers J are provided as separate tables. However, by providing serial numbers to all the word frames, it is possible to provide only a cumulative similarity buffer G and frame numbers J in all reference patterns. While dispersed word recognition is given as an example, it is also possible to obtain continuous speech recognition. Continuous speech recognition may be obtained by storing finite state automaton states as well as described in Literature 1. Specifically, the end may be attained by providing a controller based on finite state automaton, a work area for back tracking, etc., which are necessary for usual continuous speech recognition as shown in Literature 1.

In the threshold memory 105, at least one prevailing threshold is stored. The counting unit 106 obtains the number of branches of cumulative similarities higher than the prevailing threshold stored in the threshold memory 105 by comparing the cumulative similarities stored in the temporary pattern memory 104 with the threshold.

The threshold computing unit 107 obtains a threshold for pruning corresponding to a desired number of branches by obtaining the correspondence relation between the prevailing threshold stored in the threshold memory 105 and the corresponding number of branches as obtained in the counting unit 106. The threshold for pruning may be obtained by approximating the correspondence relation for utilization with various functions such as a finite number of linear bent lines, quadratic curves and exponential functions. The function may be selected in dependence on the necessary accuracy and permissible processing effort.

The similarity computing unit 108 computes acoustical feature similarity, with input feature parameters, of partial reference patterns or branches of higher similarities than the threshold of pruning obtained in the threshold computing unit 107 among those stored in the temporary pattern memory 104, and updates the branches in the temporary pattern memory 104 and the accumulation likelihood.

The determining unit 109 determines one of the branches stored in the temporary pattern memory 104 with the highest cumulative similarity as a result of recognition, when the similarity computations concerning all the input feature parameters have been completed, or when it has become that branches stored in the temporary pattern memory 104 all belong to a single word, and outputs the recognition result to an output terminal 110.

Figure 2:
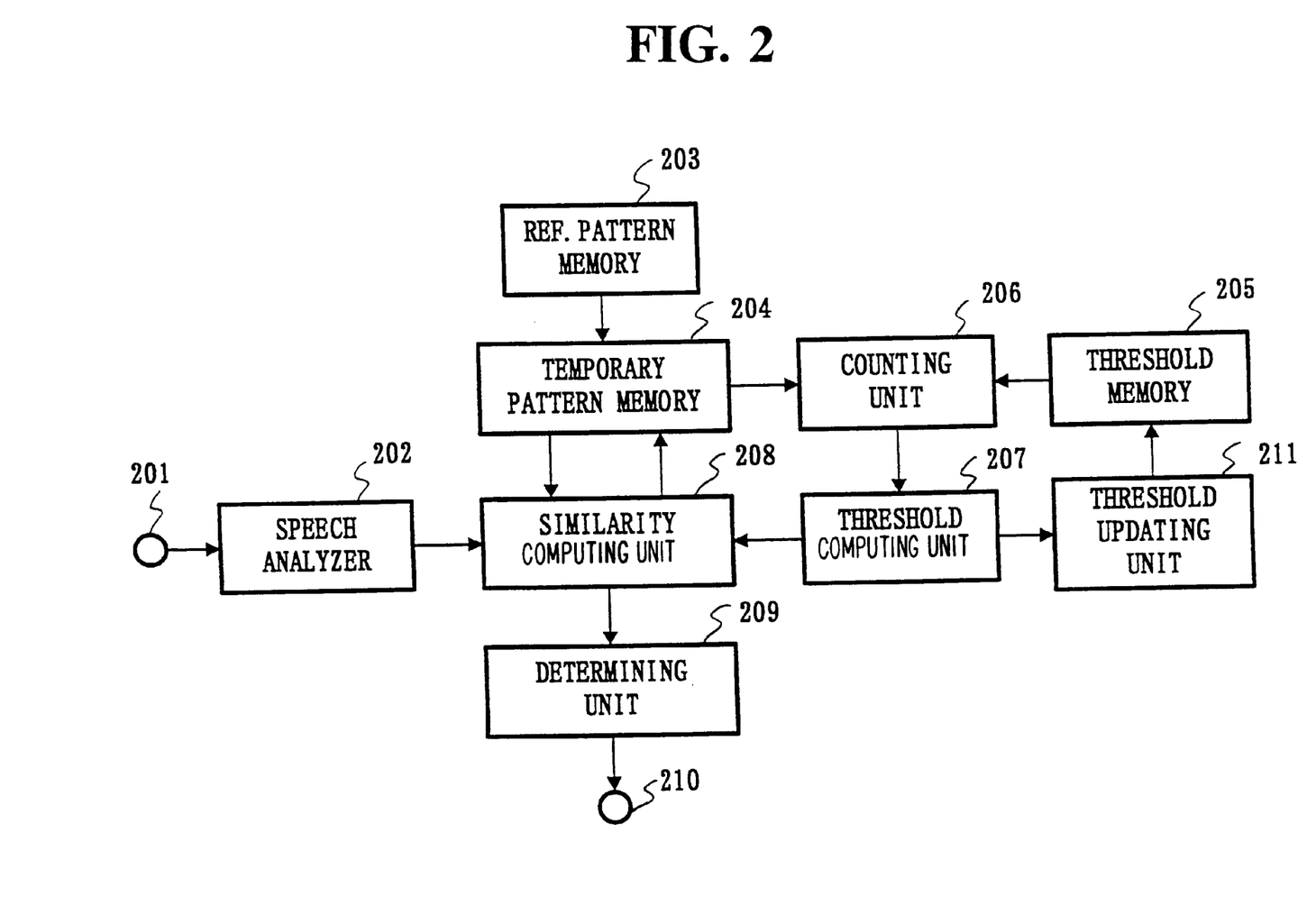
FIG. 2 is a block diagram showing a basic construction of a different embodiment of the speech recognition system according to the present invention.

FIG. 2 is a block diagram showing a basic construction of a different embodiment of the speech recognition system according to the present invention.

This speech recognition system is basically the same as the system shown in FIG. 1, and different in that it further comprises a threshold updating unit 211, which updates the prevailing threshold of pruning to values close thereto by using the prevailing threshold and the number of branches, i.e., partial reference patterns, stored in the temporary pattern memory 204 or the number of branches corresponding to at least either data stored in the threshold memory 205 with respect to the prevailing threshold or data used for the counting of branches in the counting unit 206.

In this speech recognition system, the input terminal 201, analyzing unit 202, reference pattern memory 203, temporary pattern memory 204, threshold memory 205, counting unit 206, threshold computing unit 207, similarity computing unit 208 and determining unit 209 are the same as those in the system shown in FIG. 1.

The threshold updating unit 211 updates the prevailing threshold in the manner as described hereinbelow.

Figure 3:
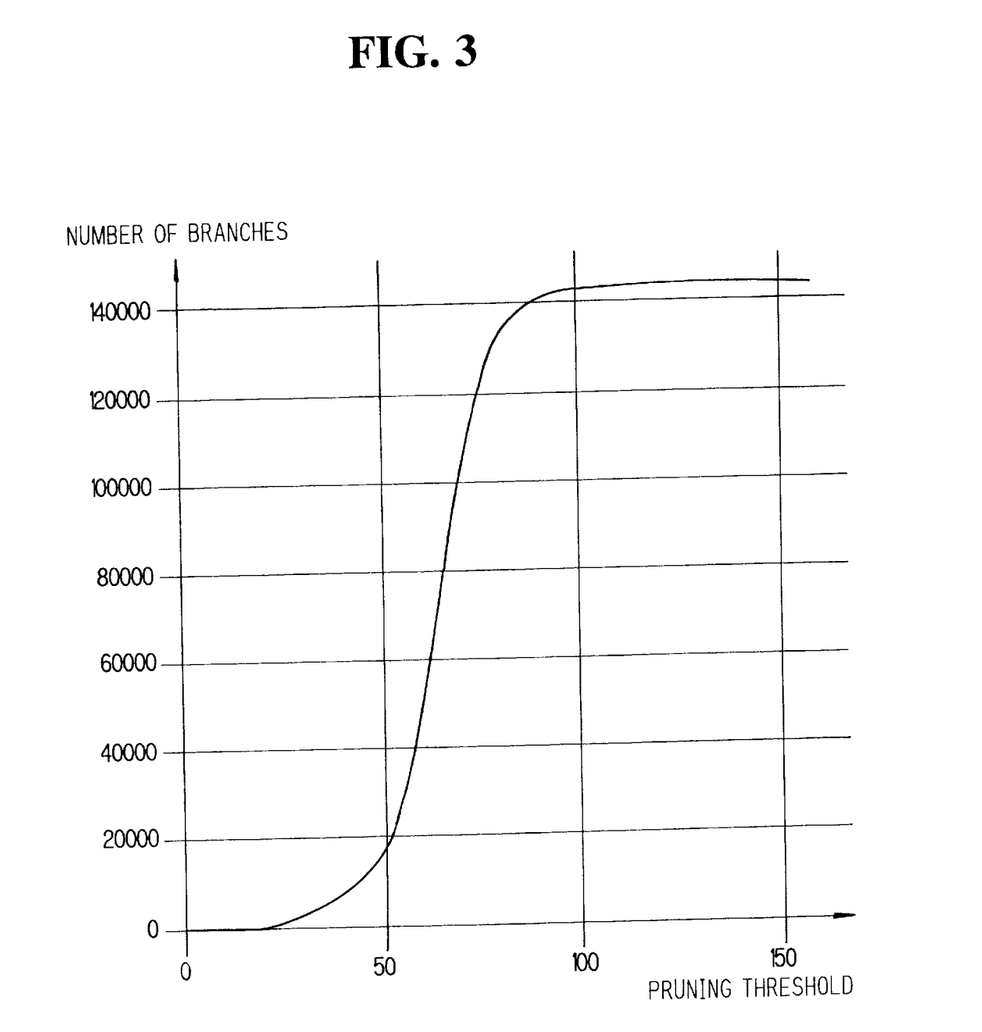
FIG. 3 shows the relation between the number of branches and the threshold of pruning at a particular instant in a frame synchronization DP matching algorithm, which is necessary for the updating of the prevailing threshold in the threshold updating unit 211.

FIG. 3 shows the relation between the number of branches and the threshold of pruning at a particular instant in a frame synchronization DP matching algorithm, which is necessary for the updating of the prevailing threshold in the threshold updating unit 211. Here, HMM (shown in, for instance, Rabiner L. R. and Juang B. H. "An introduction to Hidden Markov Models", IEEE ASSP Mag., pp. 416, 1986-1) with words as units of recognition. By the term "branch" is meant a state in which a word is constituted. The total number of branches is about 140,000. It will be seen from the FIG. 3 that the number of branches increases gently with increasing threshold of pruning and turns to increase exponentially. A case will now be considered, in which the number of branches is reduced to about several % of the total number by beam search.

Figure 4:
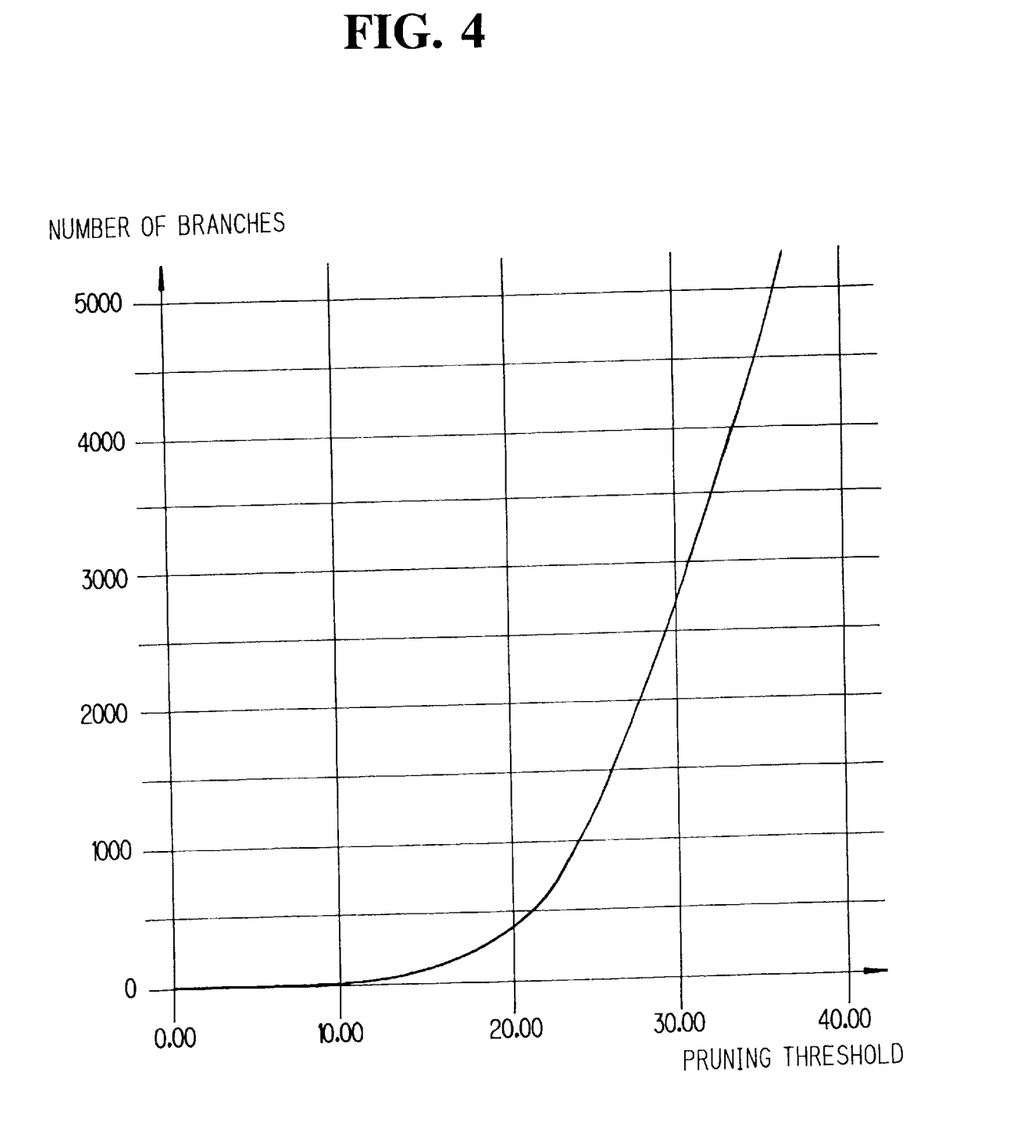
FIG. 4 is a fragmentary enlarged-scale showing of FIG. 3.

FIG. 4 is a fragmentary enlarged-scale showing of FIG. 3. It will be seen from the Figure that since the correspondence relation between the number of branches and the threshold of pruning is relatively simple, a threshold which leaves a desired number of branches can be simply obtained as the prevailing threshold by utilizing this correspondence relation if the relation is obtainable.

Figure 5:
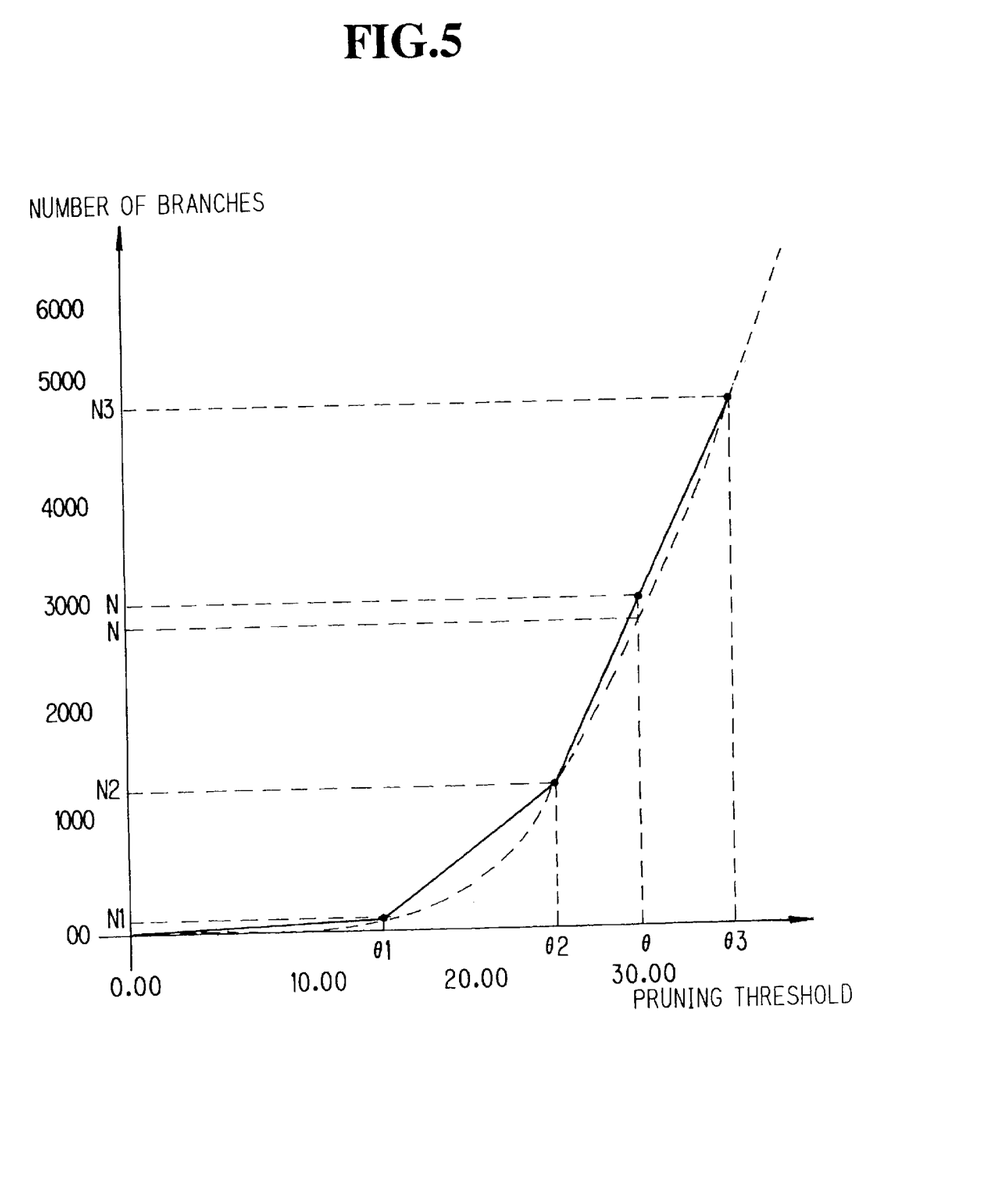
FIG. 5 shows the relation between the number of branches and the threshold of pruning, which is represented by a specific portion of the graph shown in FIG. 4.

FIG. 5 shows the relation between the number of branches and the threshold of pruning, which is represented by a specific portion of the graph shown in FIG. 4. Here, three thresholds θ1 to θ3 of pruning were given, and corresponding branch numbers N1 to N3 were obtained. The threshold updating unit 211 approximates or estimates the correspondence relation between the number of branches and the threshold of pruning from a certain number of such sets of the numbers of branches and the corresponding thresholds of pruning. The correspondence relation between the number of branches and the threshold of pruning may be approximated by utilizing various functions such as bent line approximation (i.e., a finite number of linear functions), quadratic function approximation, exponential function approximation, etc. Generally, for utilizing more complicated functions it is necessary to obtain greater numbers of branch numbers and thresholds of pruning.

In FIG. 5, the solid plot represents the correspondence relation in the case of purely bent line approximation. The broken plot represents the same correspondence relation as that shown in FIG. 4. When it is desired to set the number N of branches after pruning to be N=3,000, this is realized by setting the threshold θ of pruning to be θ30.00. In this case, the actual number of branches that are left is about 2,800. This means that the desired number of branches is obtained with an error of about 7%. Of course, the accuracy can be improved by increasing the number M of points of approximation or using functions of higher degrees. By obtaining the correspondence relation only in the neighborhood of the prevailing threshold of pruning in this way, it is possible to reduce the number of branches with high accuracy.

The threshold updating in the threshold updating unit 211 will now be described specifically with reference to FIG. 5. When a threshold of pruning has been obtained in the threshold computing unit 207 at a certain instant, it is estimated from the consideration of the continuity of speech that the threshold of pruning at the next instant is in the proximity of θ. To improve the accuracy of approximation in the proximity of θ, θ'1=θ−(θ2−θ1), θ'3=θ+(θ3−θ2) are provided, and the θ1=θ'1, θ2=θ, and θ3 =θ'3 are used as new prevailing thresholds of pruning to update the prevailing threshold in the threshold memory 205. By obtaining the correspondence relation in the proximity of the threshold of pruning which gives a desired number of branches, it is possible to obtain the prevailing threshold with high approximation accuracy even with a decimal correspondence relation.

In a different methods of thresholds updating, the relation between a desired number of branches and the actually obtained number of branches may be utilized. Specifically, denoting the desired number of branches by N and the actual number of branches left after pruning by N', when N<N', θ'1=θ1×(N/N'), θ'2=θ2×(N/N') and θ'3=θ3×(N/N') are provided, and θ1=θ'1, θ2=θ, and θ3=θ'3 are used as new prevailing threshold of pruning to update the prevailing threshold in the threshold memory 205.

It is possible not only when N<N' but also when N>N' to provide θ'1=θ1×(N'/N), θ'2=θ2×(N'/N), θ'3=θ3×(N'/N) and use θ1=θ'1, θ2=θ, and θ3=θ'3 as new prevailing threshold of pruning to update the threshold in the threshold memory 205.

The determining unit 209 thus determines one of the branches, i.e., partial reference patterns, stored in the temporary pattern memory 204 having the highest cumulative similarity as a result of recognition, when similarity computations concerning all the input feature parameters have been completed, or when the branches stored in the temporary pattern memory 204 all belong to a single word, and outputs the recognition result to the output terminal 210.

In this embodiment, the computational effort is of the order of M. The computational effort in the embodiment and that in the system shown in Literature 2 were compared under the conditions noted above. It was found that in this embodiment, since M=3 and log N=11.5, the computational effort is about one-fourth of that in the system according to Literature 2.

Figure 9:
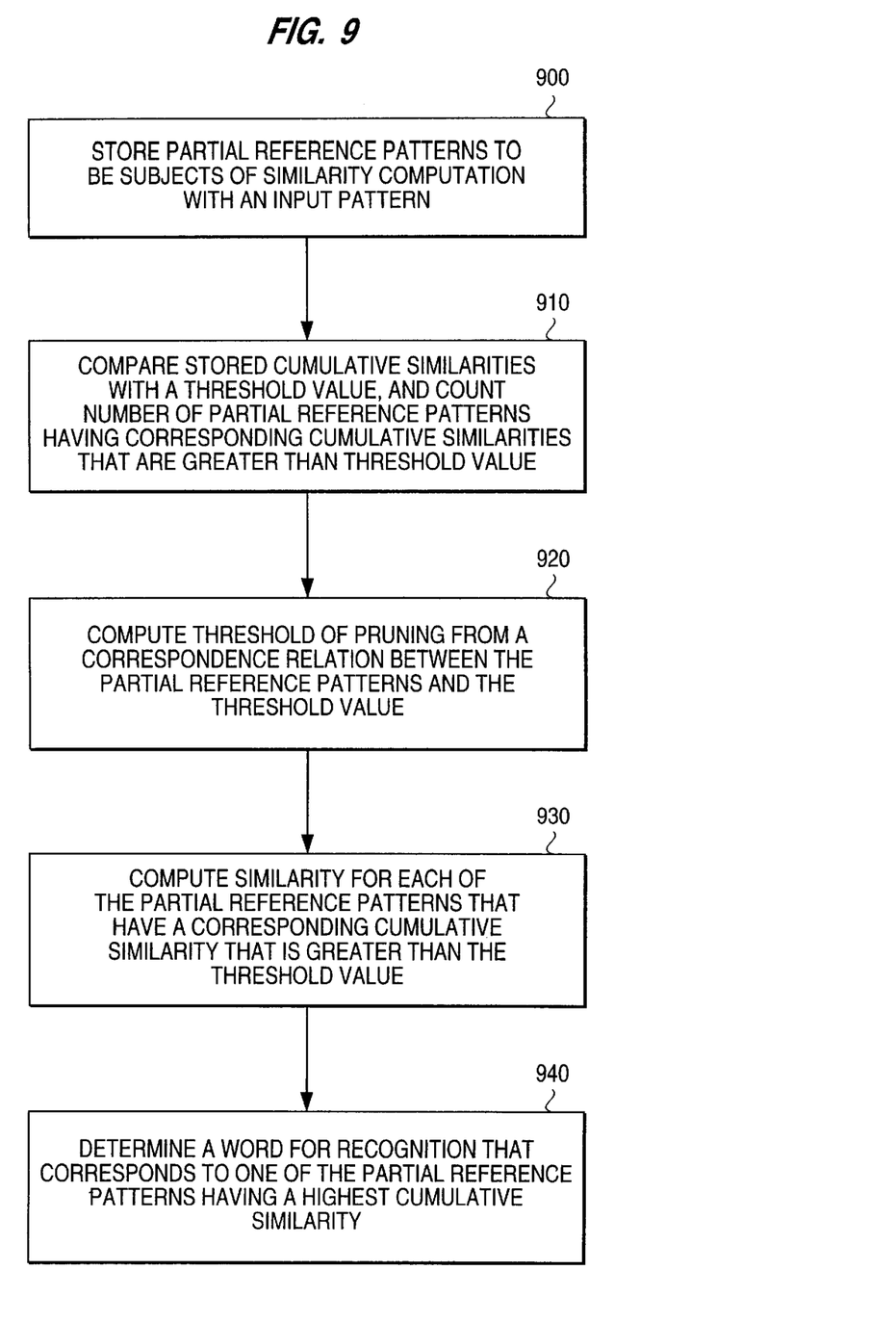
FIG. 9 is a flow chart showing a method of obtaining a word as a result of recognition according to the invention.

A speech recognizer method according to the invention is described in flow chart form in FIG. 9. In that figure, in a step 900, there is stored partial reference patterns to be subjects of similarity computation with an input pattern, and there is also stored cumulative similarities for each of the partial reference patterns. In a step 910, the stored cumulative similarities are compared with a threshold value, and the number of partial reference patterns having corresponding cumulative similarities that are greater than the threshold value are counted. In a step 920, a threshold of pruning is computed from a correspondence relation between the partial reference patterns and the threshold value. In a step 930, a similarity is computed, with respect to feature quantities of the input pattern, for each of the partial reference patterns that have a corresponding cumulative similarities that are greater than the threshold value. In a step 940, a word is determined, as a result of recognition, that corresponds to one of the partial reference patterns having a highest cumulative similarity.

As has been described in the foregoing, in the speech recognition system according to the present invention, the correspondence relation between the number of branches and the thresholds of pruning is estimated from one or more numbers of branches corresponding to prevailing thresholds, a threshold of pruning which gives a desired number of branches is obtained using this relation and used for pruning, and the prevailing threshold of pruning is updated by using values in the neighborhood of the prevailing threshold as new prevailing thresholds. It is thus possible to obtain efficient setting and updating of the prevailing threshold by beam search with less computational effort, thus permitting highly accurate and quick speech recognition.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A speech recognition system comprising:

a speech analyzing unit for analyzing an input speech waveform to extract feature quantities and converting the extracted feature quantities to an input pattern;

a reference pattern memory for storing reference patterns of words to be recognized;

a temporary pattern memory for storing partial reference patterns as subjects of similarity computation with the input pattern among the stored reference patterns, and for storing cumulative similarities for each of the partial reference patterns, the cumulative similarities representing a measure of similarity between the partial reference patterns and the input pattern;

a threshold memory for storing at least one threshold value;

a counting unit for counting a number of partial reference patterns among the stored partial reference patterns that have corresponding cumulative similarities that exceed the at least one threshold value by comparing the corresponding cumulative similarities with the at least one threshold value;

a threshold computing unit for computing a threshold of pruning which gives a predetermined number of partial reference patterns according to a correspondence relation between the predetermined number of partial reference patterns and the threshold of pruning;

a similarity computing unit for computing acoustic feature similarities with respect to the extracted feature quantities of the input speech for each of the predetermined number of partial reference patterns; and a determining unit for determining, as a result of recognition, a word corresponding to one of the predetermined number of partial reference patterns having a highest value of the computed acoustic feature similarities.

2. The speech recognizer according to claim 1, which further comprises a threshold updating unit for updating the at least one threshold value by using the at least one threshold value and the number of the partial reference patterns stored in the temporary pattern memory or the number of partial reference patterns corresponding to the data stored in the threshold memory concerning the at least one threshold value and the data used for the number of partial reference patterns in the counting unit.

3. The speech recognition system according to claim 1, wherein the threshold computing unit computes the threshold of pruning by approximating the correspondence relation between the number of partial reference patterns and the threshold of pruning with a finite number of linear functions.

4. The speech recognition system according to claim 2, wherein the threshold computing unit computes the threshold of pruning by approximating the correspondence relation between the number of partial reference patterns and the threshold of pruning with a finite number of linear functions.

5. The speech recognition system according to claim 1, wherein the determining unit determines the one of the partial reference patterns stored in the temporary pattern memory having the highest cumulative similarity as the result of recognition, when the similarity computations concerning all the input feature parameters have been completed, or when the predetermined number of partial reference patterns stored in the temporary pattern memory all belong to a single word.

6. A method of speech recognition, comprising the steps of:

storing partial reference patterns to be subjects of similarity computation with an input pattern and storing cumulative similarities for each of the partial reference patterns; comparing the stored cumulative similarities with a threshold value and counting partial reference patterns having corresponding cumulative similarities that are greater than the threshold value;

computing a threshold of pruning from a correspondence relation between the partial reference patterns and the threshold value;

computing a similarity, with respect to feature quantities of the input pattern, for each of the partial reference patterns that have corresponding cumulative similarities that are greater than the threshold value; and determining, as a result of recognition, a word corresponding to one of the partial reference patterns having a highest cumulative similarity.

* * * * *